US012111592B2

(12) United States Patent
Nishimura et al.

(10) Patent No.: US 12,111,592 B2
(45) Date of Patent: Oct. 8, 2024

(54) IMAGE HEATING DEVICE AND IMAGE FORMING APPARATUS

(71) Applicant: Canon Kabushiki Kaisha, Tokyo (JP)

(72) Inventors: Shizuma Nishimura, Shizuoka (JP); Takashi Honke, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/297,678

(22) Filed: Apr. 10, 2023

(65) Prior Publication Data

US 2023/0324834 A1 Oct. 12, 2023

(30) Foreign Application Priority Data

Apr. 12, 2022 (JP) ................................ 2022-065674

(51) Int. Cl.
*G03G 15/20* (2006.01)

(52) U.S. Cl.
CPC ..... *G03G 15/2028* (2013.01); *G03G 15/2053* (2013.01)

(58) Field of Classification Search
CPC ....... G03G 15/2053; G03G 2215/2035; G03G 15/2064; G03G 15/2028
See application file for complete search history.

(56) References Cited

U.S. PATENT DOCUMENTS

| | | | | |
|---|---|---|---|---|
| 6,993,279 B2 | 1/2006 | Fukuzawa et al. | | |
| 2011/0229226 A1* | 9/2011 | Tokuda | G03G 15/2039 | 399/329 |
| 2014/0186077 A1* | 7/2014 | Lee | G03G 15/2053 | 399/329 |
| 2018/0032005 A1* | 2/2018 | Sato | G03G 15/2053 | |
| 2021/0132526 A1* | 5/2021 | Miyashita | G03G 15/2064 | |
| 2022/0382191 A1* | 12/2022 | Furuichi | G03G 15/2017 | |

FOREIGN PATENT DOCUMENTS

| | | |
|---|---|---|
| JP | 2004281286 A | 10/2004 |
| JP | 2018141835 A | 9/2018 |
| JP | 2019082733 A | 5/2019 |
| JP | 2019113585 A | 7/2019 |

* cited by examiner

*Primary Examiner* — Jessica L Eley
(74) *Attorney, Agent, or Firm* — Venable LLP

(57) ABSTRACT

A flange member is adapted such that a first distance between a first position at which a part thereof on an upstream side in a recording material conveyance direction comes into contact with a film inner surface and a nip center that is an intersection of a first virtual line and a second virtual line is longer than a second distance between a second position at which a region of an outer surface of the flange member facing the film inner surface intersects the first virtual line and the nip center, and a film guide is adapted such that a third distance between a third position that faces the film inner surface on the upstream side and the nip center is longer than a fourth distance between a fourth position that faces the film inner surface on the downstream side and the nip center on the first virtual line.

19 Claims, 6 Drawing Sheets

IMAGE HEATING DEVICE AND IMAGE FORMING APPARATUS

BACKGROUND OF THE INVENTION

Field of the Invention

The present invention relates to an image heating device mounted on an image forming apparatus such as a copy machine or a printer that performs image formation by an electrophotographic system.

Description of the Related Art

As an image heating device mounted in an image forming apparatus, an image heating device based on a film heating system with excellent power saving characteristics is known. In an image heating device based on the film heating system, a pressurizing roller forms, with a heater, a fixation nip for sandwiching and conveying a recording material between a film and the pressurizing roller, and an unfixed toner image is fixed on the recording material by heat of the heater while pressurizing the fixation nip. The film is configured to have a tubular shape, a film guide, an inner surface sliding portion of a flange member, and the like are disposed therein along with the heater, and rotation of the film that is driven by rotation of the pressurizing roller is guided (Japanese Patent Application Laid-open No. 2004-281286).

SUMMARY OF THE INVENTION

An image heating device based on the film heating system is required to have film rotation stability and satisfactory ability to separate the recording material from the film.

An object of the present invention is to provide a technology that enables film rotation stability and an ability to separate a recording material from the film to be improved in an image heating device based on a film heating system.

In order to achieve the above object, an image heating device according to the present invention includes:

a tubular film;

a heater that is disposed in an inner space of the film;

a roller that comes into contact with an outer surface of the film and forms a nip between the roller and the film;

a film guide that guides an inner surface of the film that is driven by and rotates with rotation of the roller, the film guide is disposed in the inner space of the film over an entire region of the inner space of the film with respect to a longitudinal direction of the film; and a flange member that guides a region of end of the inner surface of the film in the longitudinal direction of the film, wherein the image heating device heats, with heat of the heater, an image formed on a recording material sandwiched and conveyed by the nip while rotation of the roller, and wherein when viewed in the longitudinal direction of the film when the film is rotated, a position on a most upstream side of an outer surface of the flange member in a conveyance direction of the recording material in a region where the inner surface of the film comes into contact is regarded as a first position, when viewed in the longitudinal direction of the film, a position at which a first virtual line that passes through the first position and is parallel with the nip intersects the outer surface of the flange member facing the inner surface of the film on a side downstream than the nip in the conveyance direction is regarded as a second position, when viewed in the longitudinal direction of the film, a position at which the first virtual line intersects an outer surface of the film guide facing the inner surface of the film on a side upstream than the nip in the conveyance direction is regarded as a third position, and when viewed in the longitudinal direction of the film, a position at which the first virtual line intersects the outer surface of the film guide on a side downstream than the nip in the conveyance direction is regarded as a fourth position, a first distance between a second virtual line perpendicular to a center of the nip in the conveyance direction and the first position is longer than a second distance between the second virtual line and the second position, and a third distance between the second virtual line and the third position is longer than a fourth distance between the second virtual line and the fourth position.

In order to achieve the above object, an image forming apparatus according to the present invention includes:

an image forming portion that forms an image on a recording material; and a fixing portion that fixes the image formed on the recording material to the recording material;

wherein the fixing portion is the image heating device of the present invention.

According to the present invention, it is possible to enable film rotation stability and an ability to separate a recording material from the film to be improved in an image heating device based on a film heating system.

Further features of the present invention will become apparent from the following description of exemplary embodiments with reference to the attached drawings.

DESCRIPTION OF THE EMBODIMENTS

Figure 1:
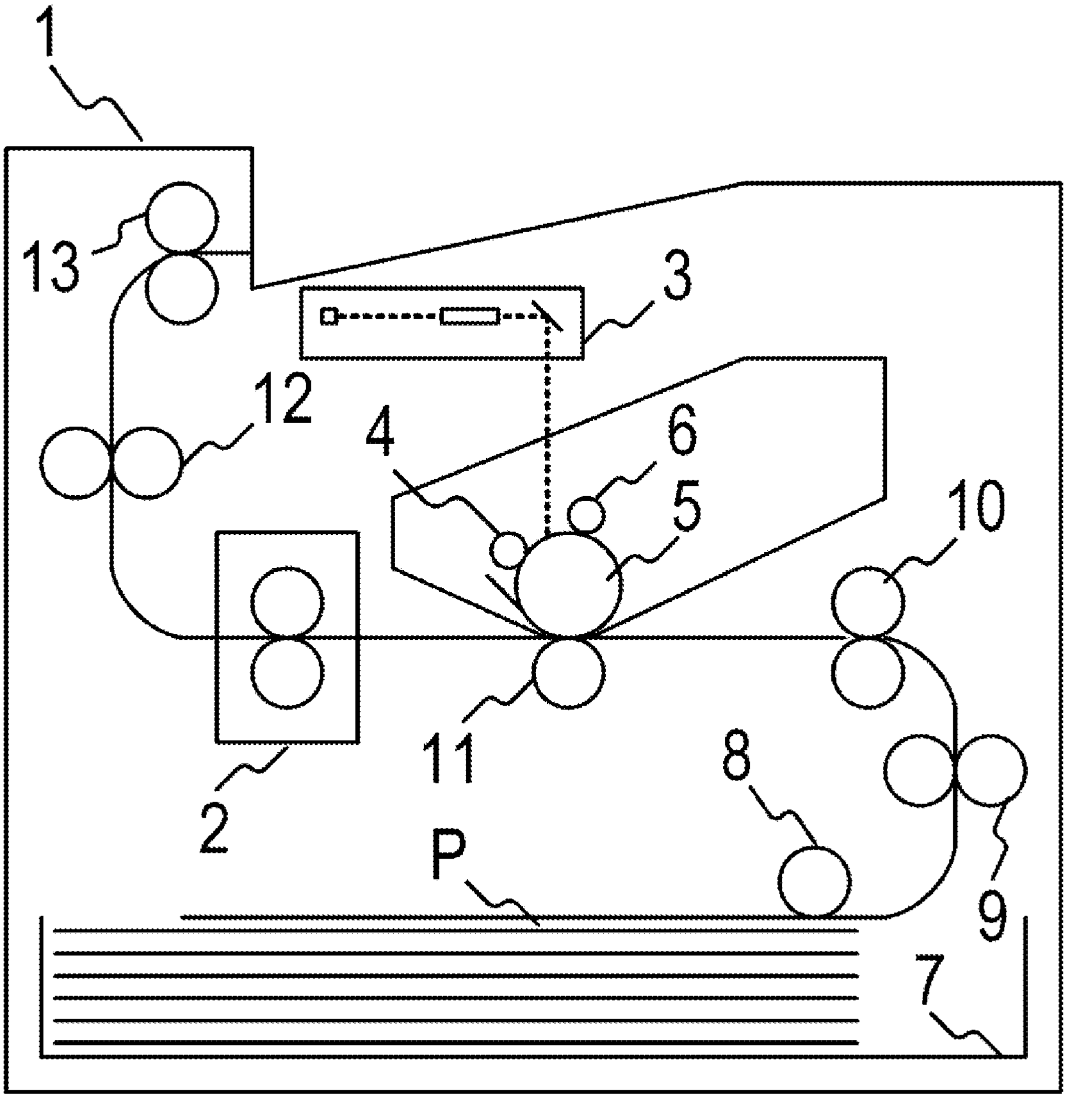
FIG. 1 is an overview sectional view of an image forming apparatus according to an embodiment of the present invention.

Referring to the drawings, forms for carrying out the present invention will be described in detail by way of example on the basis of an embodiment example. Note that dimensions, materials, shapes, relative positioning, and the like of components described in each of embodiments are to be appropriately changed in accordance with configurations of an apparatus and a device to which the invention is applied and various conditions, and are therefore not intended to limit the scope of the invention to the following embodiments.

First Embodiment

1. Configuration of Image Forming Apparatus

FIG. 1 is a schematic sectional view illustrating an overview configuration of an image forming apparatus according to a first embodiment of the present invention. An image forming apparatus 1 illustrated in FIG. 1 is a laser printer that forms an image on a recording material P by using an electrophotographic system.

Once the image forming apparatus 1 receives a print signal, a scanner unit 3 emits laser light modulated in accordance with image information thereof and scans the surface of a photoconductor drum (electrophotographic photoconductor) 5 charged with a predetermined polarity by a charging roller 4. In this manner, an electrostatic latent image is formed on the photoconductor drum 5 serving as an image carrier. The electrostatic latent image on the photoconductor drum 5 is developed as a toner image (developer image) by a development roller 6 supplying a toner charged with a predetermined polarity to the electrostatic latent image. On the other hand, pieces of recording material (recording sheets) P placed in a sheet feeding cassette 7 are fed one by one by a pickup roller 8 and are conveyed to a resist roller pair 10 by a conveyance roller pair 9. Furthermore, the recording material P is conveyed from the resist roller pair 10 to a transfer position in accordance with a timing at which the toner image on the photoconductor drum 5 reaches the transfer position formed by the photoconductor drum 5 and a transfer roller 11 serving as a transferring member. The toner image on the photoconductor drum 5 is transferred onto the recording material P in the process of the recording material P passing through the transfer position. The device configuration that is in charge of the above process until an unfixed toner image is formed on the recording material P corresponds to the image forming portion according to the present invention.

Thereafter, the recording material P is heated by using heat of a heater at a fixing device (image heating device) 2 serving as a fixing portion (image heating portion), and the toner image is fixed to the recording material P. The recording material P that carries the fixed toner image thereon is discharged to a tray at an upper portion of the image forming apparatus 1 by conveyance roller pairs 12 and 13.

The image forming apparatus 1 according to the embodiment has a maximum paper passing width of 216 mm in a direction that perpendicularly intersects the conveyance direction of the recording materials P and can perform printing on the recording materials P with an LTR size at a conveying speed of 300 mm/sec and at a rate of 60 prints per minute.

2. Configuration of Fixing Device (Image Heating Device)

Figure 2:
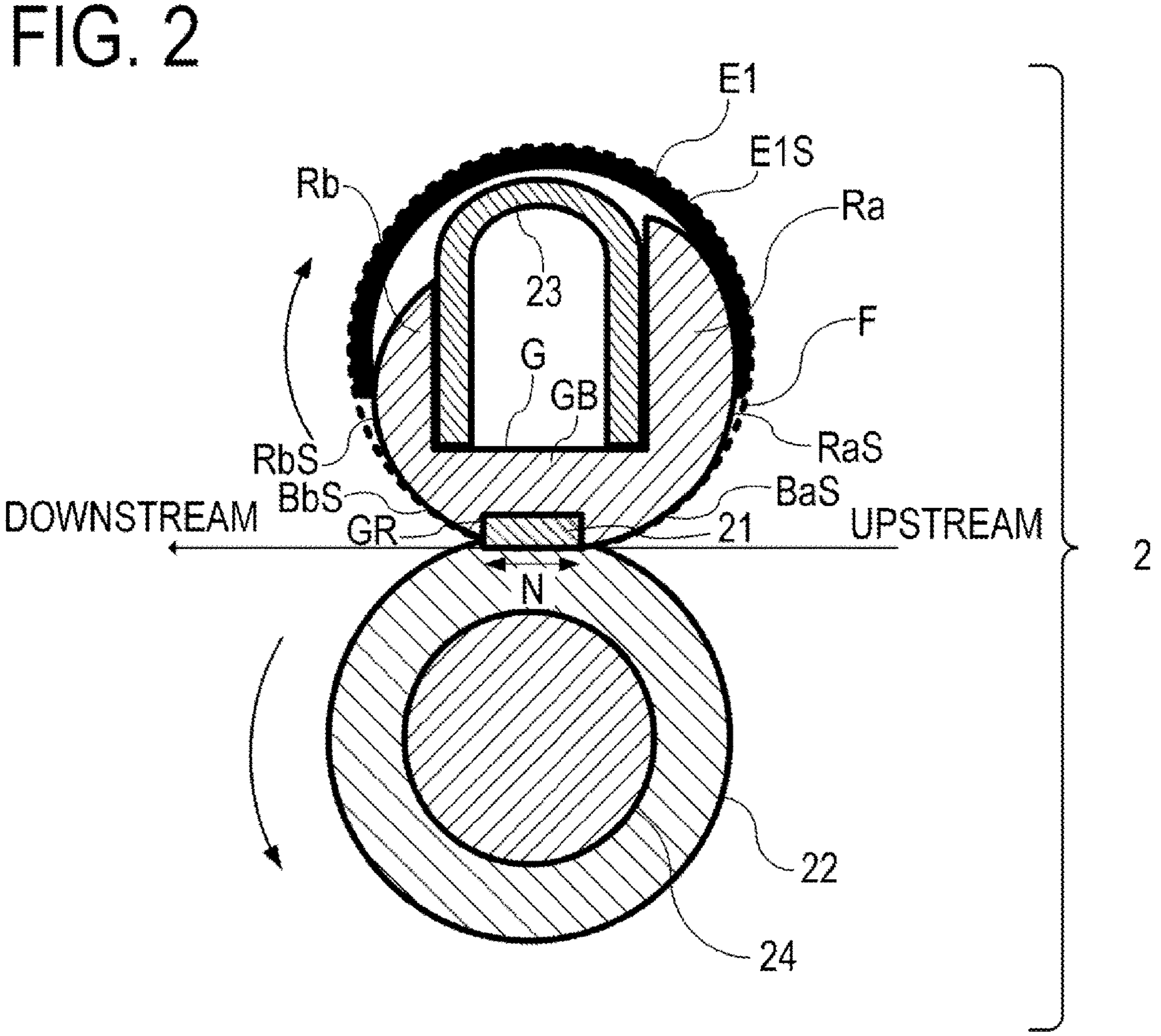
FIG. 2 is a schematic sectional view of an image heating device according to the present invention.

FIG. 2 is a side sectional view of the fixing device 2 according to the embodiment. The fixing device 2 is configured of a film F (illustrated by the dashed line in FIG. 2), a heater 21, a film guide G, a pressurizing roller 22, a metal stay 23, and a flange E (inner surface sliding portion E1). The film F is a tubular (endless-shaped) member with flexibility. The heater 21, the film guide G, the metal stay 23, and the inner surface sliding portion E1 of the flange E are disposed inside of the film F (in the inner space of the film F that is a region facing the inner circumferential surface of the film F). The pressurizing roller 22 is disposed outside of the film F (in the region facing the outer circumferential surface of the film F). The heater 21 as a heating body is disposed to come into contact with the inner surface of the film F. The film guide G also serves as a heater holder and guides the inner surface of the film F while supporting the heater 21 in a heat insulated manner. The pressurizing roller 22 is disposed to face a fixing nip portion N between itself and the outer surface of the film F along with the heater 21. The metal stay 23 pressurizes the film guide G such that an abutting state between the heater 21 and the pressurizing roller 22 via the film F is formed. The flange E as the flange member is disposed at each of both end portions of the film F in the longitudinal direction, and the inner surface sliding portion E1 is inserted into the longitudinal end portions of the film F from both sides of the film F in the longitudinal direction and guides both end portions of the film F in the longitudinal direction from the inner surface of the film F. The configuration of the flange E in the longitudinal direction will be described later.

Here, the longitudinal direction of the film F is a direction along the central axis of the cylindrical shape of the film F and coincides each of the longitudinal direction of the heater 21, the metal stay 23, and the film guide G, the longitudinal direction (rotation axis direction) of the pressurizing roller 22, and the width direction of the recording materials that perpendicularly intersects the conveyance direction of the recording materials P.

The film F is a heat-resistant film formed into a tubular shape and contains a heat-resistant resin such as polyimide as a base layer. Also, a heat-resistant resin with excellent mold releasability such as a tetrafluoroethylene perfluoroalkyl vinyl ether copolymer is applied to the surface of the film F to form a mold releasable layer thereon in order to secure prevention of toner adhesion and secure an ability to achieve separation from the recording material P. In order to improve image quality, heat-resistant rubber such as silicone rubber may be formed as an elastic layer between the above base layer and the mold releasable layer. The film F in the embodiment has an outer diameter of 24 mm, includes the base layer formed by polyimide to have a thickness of 70 μm, includes the elastic layer formed of silicone rubber to have a thickness of 200 μm, and includes the mold releasable layer formed of PFA to have a thickness of 15 μm.

The heater 21 is a low heat capacity ceramic heater, includes a resistance heating element formed on a substrate, and is configured to generate heat to be used for fixation heating processing by the heat generating resistor generating heat through power distribution. A temperature detecting element (not illustrated) such as a thermistor is installed on the side opposite to the fixing nip portion N of the heater 21, and power distribution to the heater 21 is controlled on the basis of the detected temperature.

The film guide G is composed of a heat resistant resin, a composite material such as a heat resistant resin and a ceramic, metal, glass, or the like. Examples of the heat resistant resin include polyphenylene sulfide (PPS), polyamideimide (PAI), polyimide (PI), polyether ether ketone (PEEK), a liquid crystal polymer, and the like. The film guide G is provided with a plurality of ribs Ra and Rb such that they stick out in the radial direction toward the inner surface of the film F for the purpose of reducing a sliding resistance with respect to the film F while stabilizing a rotation trajectory of the film F. The film guide G includes guide surfaces that support the heater 21 and guide the inner surface of the film F to each of both sides in the rotation direction of the film F relative to the heater 21. The film guide G includes a base portion GB including a recessed portion GR serving as an accommodating portion for holding the heater 21, the rib Ra that is a first rib provided on the upstream side of the base portion GB in the conveyance direction of the recording material P, and the rib Rb that is a second rib provided on the downstream side. The base portion GB is provided such that the recessed portion GR extends in the film longitudinal direction on the side facing the inner surface of the film F. Also, the base portion GB includes film guide curved surfaces BaS and BbS with projecting shapes for guiding the inner surface of the film F as the aforementioned guide surfaces on both sides of the recessed portion GR in the conveyance direction of the recording material P (rotation direction of the film F). The ribs Ra and Rb include film guide curved surfaces RaS and RbS with projecting portions for guiding the inner surface of the film F continuously with the film guide curved surfaces BaS and BbS of the base portion GB, respectively. The embodiment is configured such that the sticking-out amount of the rib Ra on the upstream side from the base portion GB toward the inner surface of the film F is larger than that of the rib Rb on the downstream side. The configurations and sticking-out configurations of the ribs Ra and Rb in the film longitudinal direction will be described later.

Figure 6A:
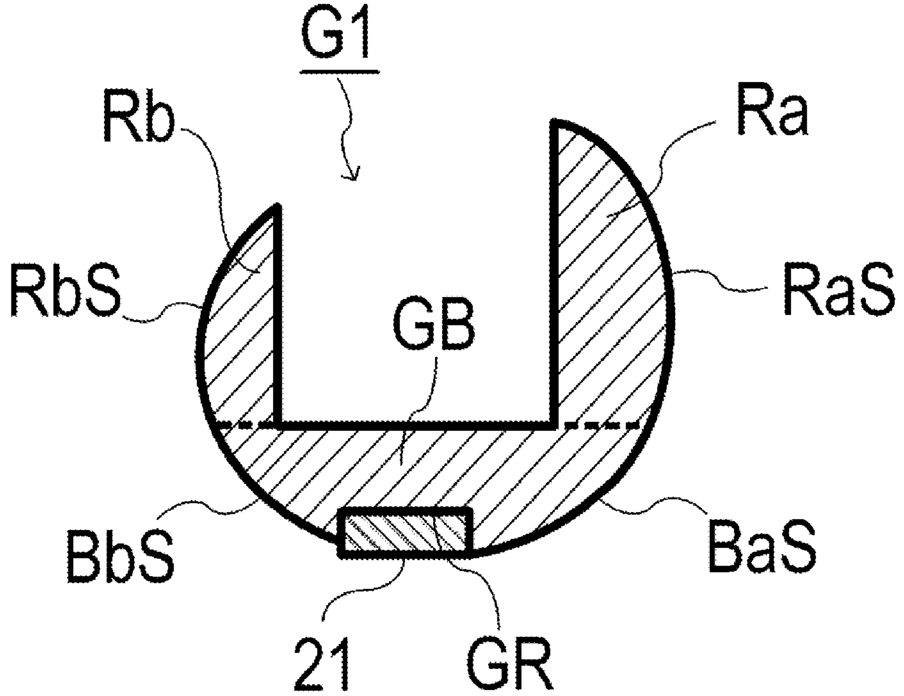
FIGS. 6A and 6B are schematic sectional views of a configuration example of a film guide.
Figure 6B:
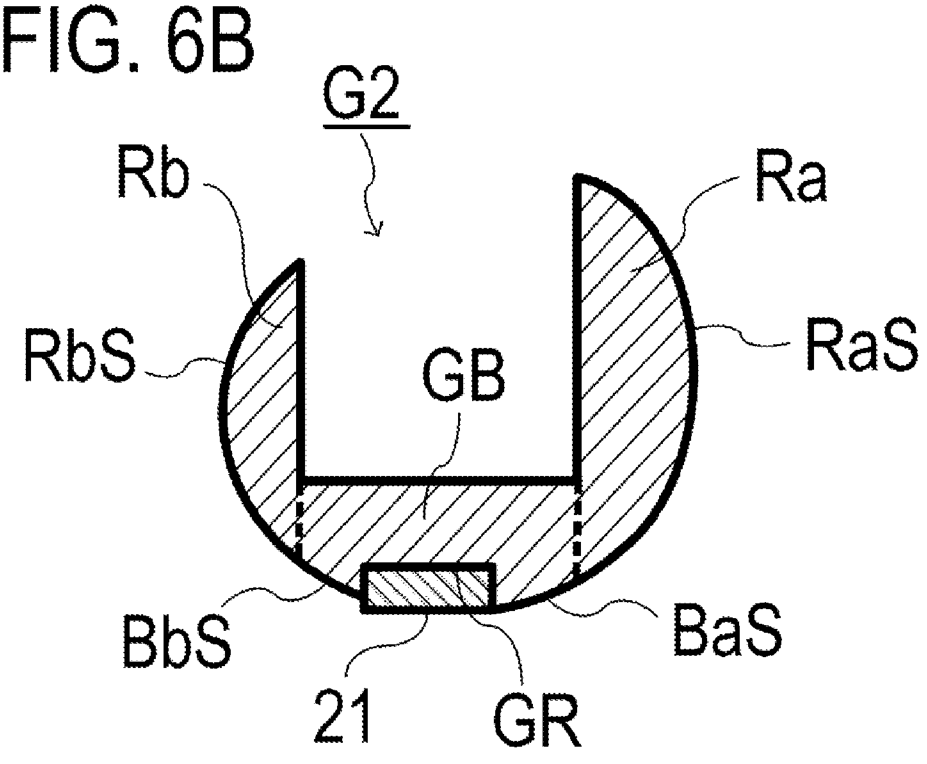

FIGS. 6A and 6B are schematic sectional views of a configuration example of the film guide G. As an example of the film guide G, a configuration in which each of the ribs Ra and Rb projects from the upper surface of the base portion GB (the surface on the side opposite to the side including the recessed portion GR) like the film guide G1 illustrated in FIG. 6A may be adopted. In this configuration, the rib Ra on the upstream side is further separated from the fixing nip portion N in the conveyance direction of the recording material than the rib Rb on the downstream side, the thickness in the thickness direction of the rib Ra is thicker than that of the rib Rb, and the height (projecting amount) of the rib Ra from the base portion GB is larger than that of the rib Rb. In another example, a configuration in which each of the ribs Ra and Rb projects from side surfaces of the base portion GB (both side surfaces in the conveyance direction of the recording material) like the film guide G2 illustrated in FIG. 6B may be adopted. In this configuration, the projecting amount of the rib Ra on the upstream side from the base portion GB in the conveyance direction of the recording material is larger than that of the rib Rb on the downstream side, and the height (projecting amount) of the rib Ra from the base portion GB is also larger than that of the rib Rb. The configuration illustrated in FIGS. 6A and 6B are illustrated just as an example, and another configuration in which the rib on the upstream side in the conveyance direction of the recording material is configured as illustrated in FIG. 6A while the rib on the downstream side is configured as illustrated in FIG. 6B, for example, may be employed.

The heater 21 is fixed to and supported by the film guide G, and the outer circumferential length of the film guide G including the heater 21 is set to be smaller than the inner circumferential length of the film F. Therefore, the film F is fitted onto the film guide G including the heater 21 with a margin.

The pressurizing roller 22 includes an elastic layer of a material such as silicone rubber on a core metal 24 of a material such as iron, SUS, or aluminum. Also, a heat-resistant resin with excellent mold releasability such as a tetrafluoroethylene perfluoroalkyl vinyl ether copolymer is applied to the surface of the pressurizing roller 22 to form a mold releasable layer in order to prevent toner adhesion. In the embodiment, the outer diameter of the pressurizing roller 22 is 24 mm.

The metal stay 23 is a metal plate bent into a U shape and biases the film guide G including the heater 21 on the side of the pressurizing roller 22 with a predetermined pressurizing force. In this manner, the film F is brought into pressure contact with the pressurizing roller 22, and the film F and the pressurizing roller 22 forms the fixing nip portion N.

The pressurizing roller 22 receives power from a motor (not illustrated) and rotates in the arrow direction. The film F is driven by the rotation of the pressurizing roller 22 and rotates in the arrow direction. The unfixed toner image on the recording material P is fixed by applying heat of the film F while sandwiching and conveying the recording material P from the upstream side to the downstream side with the fixing nip portion N.

Figure 3A:
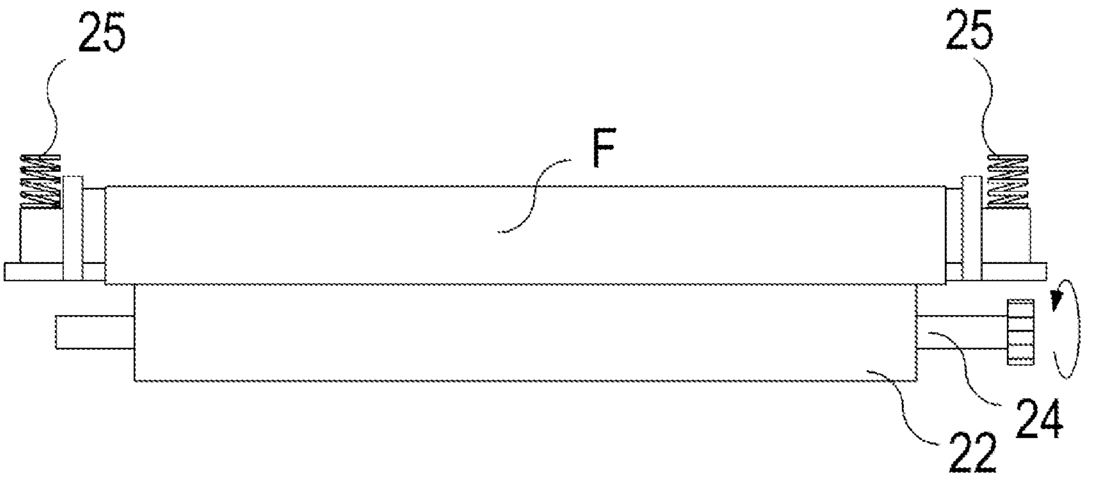
FIGS. 3A to 3C are schematic views of the image heating device according to the present invention.
Figure 3B:
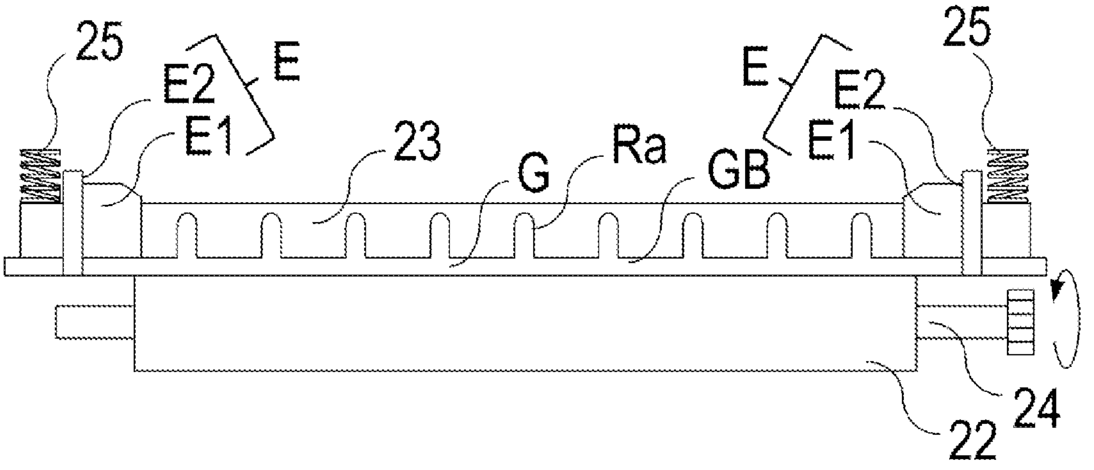
Figure 3C:
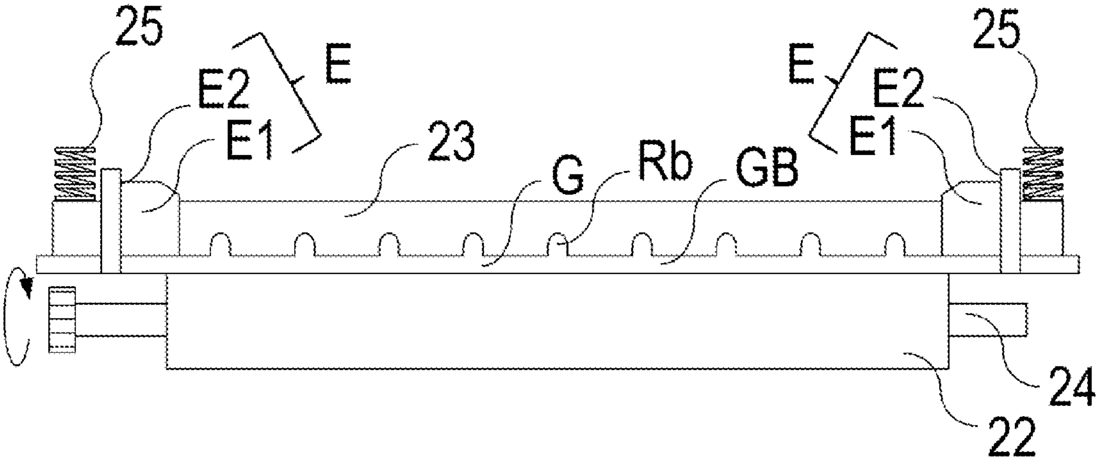

FIGS. 3A, 3B, and 3C are front views of the fixing device 2 in the embodiment (schematic front views of the fixing device 2 seen in the conveyance direction of the recording material P), and FIGS. 3B and 3C are illustrated with illustration of the film F omitted. Also, FIGS. 3A and 3B are front views seen from the conveyance upstream side of the recording material P, and FIG. 3C is a front view seen from the conveyance downstream side of the recording material P.

The metal stay 23 transmits a spring pressure of pressurizing springs 25 to the side of the pressurizing roller 22 by being biased in the direction in which the film guide G is directed to the pressurizing roller 22 with the pressurizing springs 25 installed at both end portions in the longitudinal direction as illustrated in FIGS. 3B and 3C.

The flange E includes a semicircular inner surface sliding portion E1 and an end portion abutting portion E2 provided at an outer side end portion of the inner surface sliding portion E1 in the longitudinal direction and is formed of a heat-resistant material. The semicircular outer circumferential surface of the inner surface sliding portion E1 forms a film guide curved surface E1S (see FIG. 2) with a projecting shape, and a tubular end portion of the film F is fitted to surround the outer circumferential surface. The inner surface sliding portion E1 restricts a rotation trajectory of the film F by the inner surface of the film F being caused to slid along the outer circumferential surface thereof. The outer circumferential length of the inner surface sliding portion E1 (the circumferential length of the film guide curved surface E1S) is set to be longer than the outer circumferential length of the film guide G (the circumferential lengths of regions of the film guide curved surfaces RaS and RbS that do not overlap the film guide curved surface E1S+the circumferential lengths of the film guide curved surfaces BaS and BbS). Also, the inner surface sliding portion E1 guides the regions at both ends of the inner surface of the film F in the longitudinal direction, and the film guide G guides the inner surface of the film F on the side further inward in the longitudinal direction than the inner surface sliding portion E1. In other words, the flange E guides the film inner surface in the form in which the flange further sticks out in the radial direction than the film guide G on both outer sides in the longitudinal direction relative to the region of the inner surface of the film F where the film guide G performs guide. Therefore, the rotation trajectory of the film F is determined mainly by the outer circumferential length of the inner surface sliding portion E1. On the other hand, the end portion abutting portion E2 receives the tubular end portion outer end surface of the film F by its inner side surface and curbs motion of the film F during a rotating operation in the longitudinal direction.

The film guide G includes the base portion GB that holds the heater 21 and the ribs Ra and Rb, each of which projects from the base portion GB, as described above. A plurality of the ribs Ra and a plurality of the ribs Rb are disposed to be aligned at specific intervals in the longitudinal direction. In other words, the film guide curved surface of the film guide G is formed over the entire region in the film longitudinal direction at the base portion GB and is formed intermittently in the film longitudinal direction at the ribs Ra and Rb.

In the embodiment, the number of the plurality of ribs Ra provided on the upstream side is the same as the number of the plurality of ribs Rb provided on the downstream side, and the ribs are configured such that dispositions thereof in the longitudinal direction coincide with each other. In other words, the plurality of ribs Ra on the upstream side and the plurality of ribs Rb on the downstream side overlap each other in the disposition when they are seen in the conveyance direction of the recording material as illustrated in FIGS. 3B and 3C. Note that the disposition configuration of the plurality of ribs Ra on the upstream side and the plurality of ribs Rb on the downstream side is not limited to the above configuration. For example, a disposition configuration in which the ribs deviate from each other in the longitudinal direction may be adopted, the disposition intervals may not be constant, the sticking-out amounts may differ from each other, and further, the numbers of ribs may be different on the upstream side and the downstream side.

As described above, the base portion GB includes film guide curved surfaces BaS and BbS on both sides of the recessed portion GR accommodating the heater 21 in the conveyance direction of the recording material. The ribs Ra and Rb include film guide curved surfaces RaS and RbS with projecting shapes extending in the direction along the inner circumferential surface of the film F from the base portion GB and facing the inner circumferential surface of the film F. In other words, the film guide G has an upstream-side guide curved surface in which the film guide curved surface BaS and the film guide curved surface RaS continue on the upstream side of the heater 21 in the conveyance direction of the recording material, and has a downs-stream guide curved surface in which the film guide curved surface BbS and the film guide curved surface RbS continue on the downstream side.

The film guide curved surface of the film guide G may be configured to have a curvature radius that is smaller than the diameter of the film F in a case where the circumference of the film F forms a true circle or the curvature radius of the guide curved surface of the inner surface sliding portion E1 of the flange E when seen in the longitudinal direction of the film F (FIG. 2). Alternatively, the curved surface may not have a constant curvature radius and may have a curvature radius that gradually changes. In other words, any curved surface shape may be adopted as long as stability of guiding rotation of the film F, which will be described later, is secured (rotation is not prevented).

Also, the projection height of the ribs Ra on the upstream side from the base portion GB may be configured to be higher than that of the ribs Rb on the downstream side (the projecting amount of the ribs Ra in the direction that perpendicularly intersects the conveyance direction of the recording material and the longitudinal direction is larger), such that the projecting amount from the fixing nip portion N in the conveyance direction of the recording material of the ribs Ra is larger. Also, although the outer shape of each of the plurality of ribs Ra may be the same shape when seen in the film longitudinal direction in the embodiment, the ribs Ra may be configured to have mutually different outer shapes. The same applies to the plurality of the ribs Rb. Also, although the thicknesses of the ribs Ra and Rb in the longitudinal direction are configured to be substantially the same in the embodiment, the thicknesses may be different from each other. In other words, the configurations, the dispositions, and the like of the ribs Ra and Rb may be arbitrarily set as long as stability of guiding the rotation of the film F, which will be described later, is secured (rotation is not prevented).

3. Configuration of Film Guide

Figure 4A:
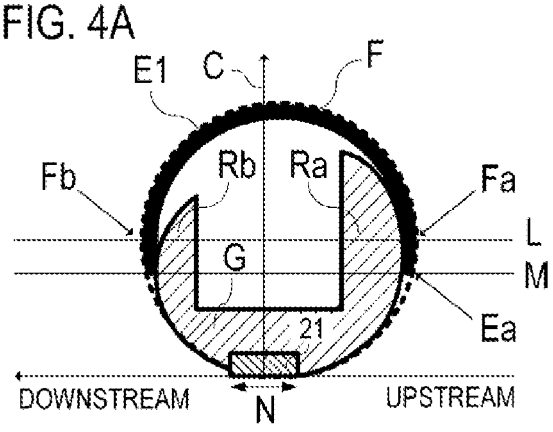
FIGS. 4A to 4F are schematic sectional views of the image heating device according to the present invention.

FIG. 4A is a partial sectional view of the fixing device seen in the direction that perpendicularly intersects the conveyance direction of the recording material and indicating the positional relationship between the ribs Ra on the upstream side and the ribs Rb on the downstream side of the film guide G and the film F (dashed line) restricted by the inner surface sliding portion E1 of the flange E in the embodiment. In the drawing, the position Fa as a first position is a location where the inner surface sliding portion E1 of the flange E restricts the inner surface of the film F on the most upstream side in the conveyance direction of the recording material on the upstream side of the fixing nip portion N in the conveyance direction of the recording material. In other words, the position Fa is a position at which the most projecting portion on the upstream side in the conveyance direction of the recording material in the inner surface sliding portion E1 of the flange E comes into contact with the inner surface of the film F. The horizontal line L is a first virtual line that passes through the position Fa and is parallel with the fixing nip portion N that is a contact region between the film F and the pressurizing roller 22 or the conveyance direction of the recording material. Also, the position Fb as a second position is an intersection between the horizontal line L and the region of the outer surface of the inner surface sliding portion E1 of the flange E restricting the inner surface of the film F on the downstream side of the fixing nip portion N in the conveyance direction of the recording material. Note that the film F is deformed to be slightly pulled on the downstream side in the conveyance direction of the recording material with rotation driven by the pressurizing roller 22 at least when the fixing device is driven. In this manner, the contact of the inner surface of the film F is restricted only to the position Fa by the inner surface sliding portion E1, and the inner surface does not come into contact at the position Fb. In other words, the position Fb is a position at which the horizontal line L intersects the outer surface of the inner surface sliding portion E1 of the flange E facing the inner surface of the film F on the side further downstream than the fixing nip portion N in the conveyance direction of the recording material. Furthermore, the position Ea in the drawing is a location of the end of the upstream side in the conveyance direction of the recording material at which the inner surface of the film F is restricted by the inner surface sliding portion E1 of the flange E. The horizontal line M is a virtual line that passes through the position Ea and is parallel with the fixing nip portion N. The film guide curved surface E1S of the flange E is adapted such that the horizontal line L passes through the center of curvature when seen in the longitudinal direction of the film F and the end portion on the upstream side and the end portion on the downstream side in the conveyance direction of the recording material extend on the side closer to the fixing nip portion N than the horizontal line L. In other words, both end portions of the film guide curved surface E1S are located at positions closer to the fixing nip portion N than the horizontal line L in the direction (the vertical direction in the embodiment) that perpendicularly intersects each of the conveyance direction of the recording material and the film longitudinal direction.

Figure 4D:
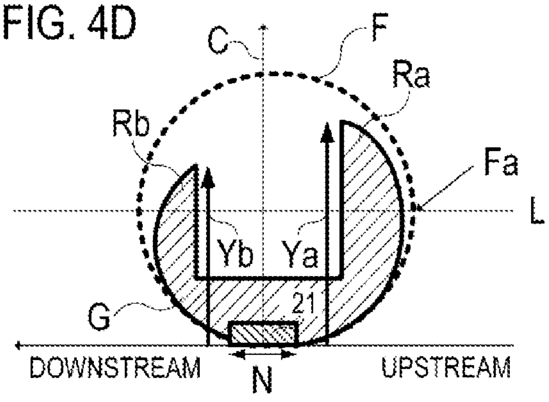
Figure 4B:
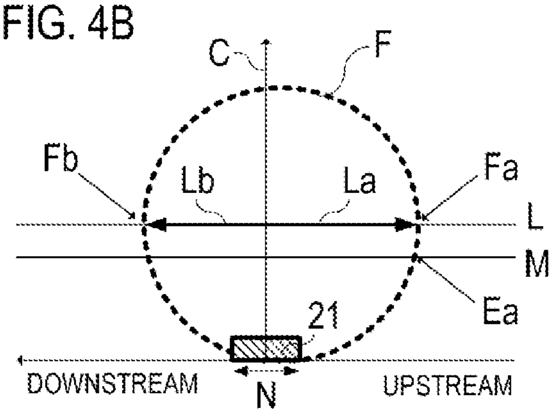

FIG. 4B is a partial sectional view of the fixing device with illustration of the film guide G and the inner surface sliding portion E1 of the flange E omitted in FIG. 4A. In the drawing, the distance La as the first distance indicates the distance from the intersection with the center line C of the fixing nip portion N on the horizontal line L to the restriction position Fa of the inner surface sliding portion E1 of the flange E. The center line C of the fixing nip portion N is a second virtual line that extends in a direction (vertical direction in the embodiment) that perpendicularly intersects the conveyance direction of the recording material and the film longitudinal direction and passes through the center of the width of the fixing nip portion N in the conveyance direction of the recording material. Also, the distance Lb as a second distance indicates the distance from the intersection with the center line C of the fixing nip portion N on the horizontal line L to the restriction position Fb of the inner surface sliding portion E1 of the flange E. In the embodiment, the distance La is 13 mm, and Lb is 11 mm, that is, the inner surface sliding portion E1 of the flange E is offset by 1 mm on the upstream side relative to the fixing nip portion N. This is for reducing the curvature radius of the film F on the downstream side of the fixing nip portion N in the conveyance direction of the recording material and improving an ability to achieve separation from the recording material P.

FIGS. 4C to 4F are partial sectional views of the fixing device with illustration of the inner surface sliding portion E1 of the flange E omitted in FIG. 4A.

Figure 4E:
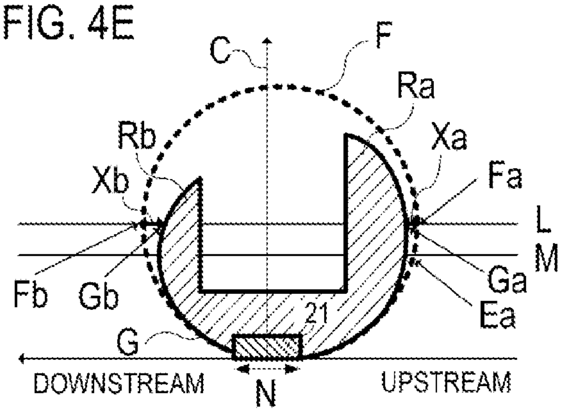
Figure 4C:
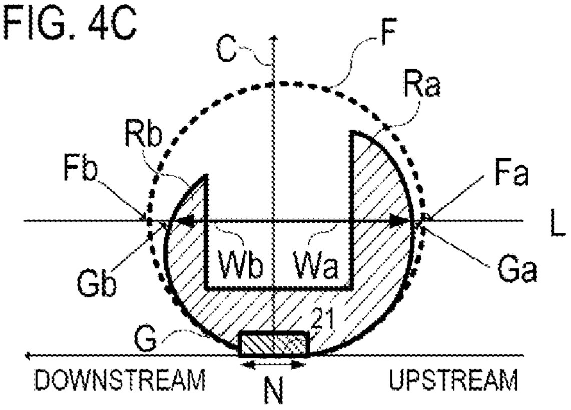

FIG. 4C illustrates the distances Wa and Wb from the intersection with the center line C of the fixing nip portion N to the outer circumferential surfaces of the ribs Ra and the ribs Rb on the virtual line that is parallel with the conveyance direction of the recording material when seen in the longitudinal direction of the film (the direction that perpendicularly intersects the conveyance direction of the recording material). In other words, the distance Wa as the third distance indicates a distance from the intersection between the horizontal line L and the center line C of the fixing nip portion N to the position Ga as the third position at which the region of the outer surface of the film guide G facing the inner surface of the film F on the side further upstream than the fixing nip portion N in the conveyance direction of the recording material and the horizontal line L intersect each other. Also, the distance Wb as the fourth distance indicates a distance from the intersection between the horizontal line L and the center line C of the fixing nip portion N to the position Gb as the fourth position at which the region of the outer surface of the film guide G facing the inner surface of the film F on the side further downstream than the fixing nip portion N in the conveyance direction of the recording material and the horizontal line L intersect each other. The film F is maintained in the tubular shape over the entire region in the longitudinal direction in a state where stretching is kept to some extent by both ends thereof being supported by the flange E. Therefore, the film guide G does not come into contact with the inner surface of the film F even at the center portion in the longitudinal direction thereof, for example, at least on the horizontal line L.

FIG. 4D illustrates heights Ya and Yb of the outer circumferential surfaces of the ribs Ra and the ribs Rb in the vertical direction from the fixing nip portion N when seen in the longitudinal direction of the film. In the embodiment, the distance Wa in is 12 mm and the distance Wb is 9.5 mm in the width direction, and the distance Ya is 16 mm and the distance Yb is 13 mm in the height direction. As described above, the amount of offset by the inner surface sliding portion E1 of the flange E is 1 mm, the offset is canceled by the configuration in which the ribs Ra on the upstream side stick out, and the clearance between the film F and the ribs Ra on the upstream side is thus not widened. Therefore, since an impact due to entry of the recording material P is received by the ribs Ra on the upstream side, buckling of the film F is prevented.

Note that although the above description was given on the assumption that the center line passing in the vertical direction through the center of the width of the fixing nip portion N in the conveyance direction of the recording material is regarded as a reference, various positional relationships may be defined with reference to a center line passing in the vertical direction through the width center of the heater 21 or the recessed portion GR of the film guide G in the same direction. Also, although the positional relationship of each configuration has been defined on the assumption of a disposition configuration in which the film (the heater and the film guide) and the pressurizing roller are aligned in the vertical direction as an installation state that is generally assumed for a fixing device (image forming apparatus) in the embodiment, the present invention is not limited to such a disposition configuration. For example, it is needless to say that the positional relationship of each configuration is defined on the assumption of a disposition configuration in which the film and the pressurizing roller are aligned in the horizontal direction in a case where such a disposition configuration is employed. In other words, the positional relationship defined in the vertical direction is defined in the horizontal direction, and the positional relationship defined in the horizontal direction is defined in the vertical direction in this case.

Figure 5A:
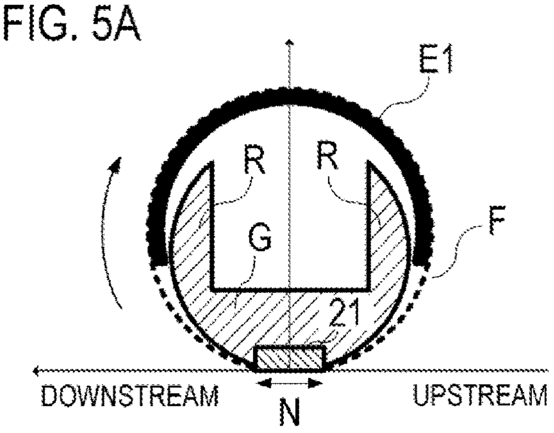
FIGS. 5A to 5D are schematic sectional views of an image heating device according to a comparative example.
Figure 5C:
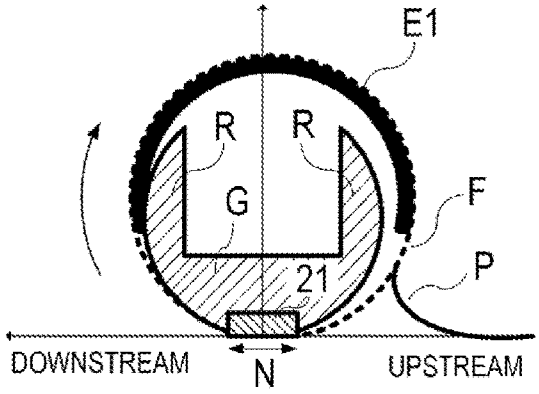
Figure 5B:
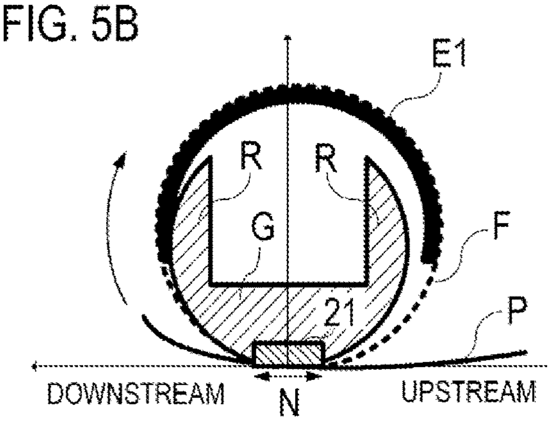
Figure 5D:
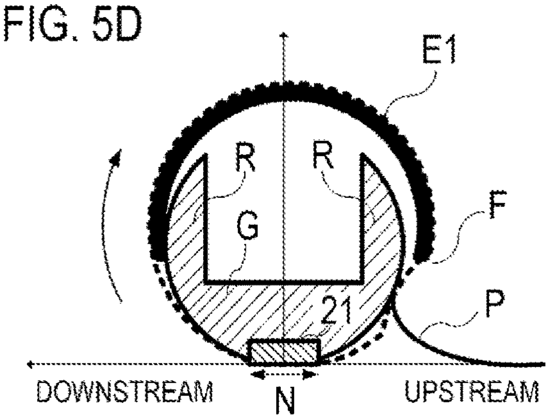

Here, an effect of preventing buckling of the film F in the fixing device according to the embodiment will be described in comparison with a comparative example. FIG. 5A is a partial sectional view of the fixing device according to a comparative example configured to prevent ribs R from damaging the film F by reducing the ribs R of the film guide G in the rotation center direction of the film F as compared with the inner surface sliding portion E1 of the flange E. The inner surface sliding portion E1 of the flange E is not offset in this fixing device, and the fixing device according to the embodiment is more advantageous in terms of an ability to achieve separation between the film F and the recording material P. FIG. 5B illustrates a configuration in which the inner surface sliding portion E1 of the flange E is offset on the upstream side relative to the fixing nip portion N in order to improve an ability to achieve separation from the recording material P by reducing a curvature radius of the film F on the downstream side of the fixing nip portion N in the fixing device illustrated in FIG. 5A. However, the clearance between the film F and the ribs R is widened on the upstream side of the fixing device in this configuration. Therefore, buckling may occur at the longitudinal center portion of the film F due to an impact of entry of the recording material P as illustrated in FIG. 5D in a case where the recording material P bounces and enters the fixing nip portion N as illustrated in FIG. 5C.

Occurrence of such buckling may more significantly occur in an image forming apparatus that requires to operate at a higher speed in recent years. In addition, there is also a concern of a likelihood of film breakage in an extreme case depending on a configuration in which the thickness of the film is reduced. On the other hand, the fixing device according to the embodiment is configured such that the clearance between the film F and the ribs Ra on the upstream side is not widened with the configuration in which the ribs Ra on the upstream side stick out as described above. Hereinafter, the sticking-out configuration of the ribs Ra on the upstream side will be described in more detail.

FIG. 4E illustrates a gap Xa on the upstream side in the conveyance direction of the recording material between the ribs Ra and the film F and a gap Xb on the downstream side in the conveyance direction of the recording material between the ribs Rb and the film F in the section sandwiched between the horizontal line L and the horizontal line M when seen in the longitudinal direction of the film. Since there is no restriction by the inner surface sliding portion E1 of the flange E from the position Ea to the fixing nip portion N on the rotation trajectory of the film F, the trajectory of the film F can be relatively freely changed. Therefore, buckling of the film F is unlikely to occur. On the other hand, the film F is restricted by the inner surface sliding portion E1 of the flange E in the section sandwiched by the horizontal line L and the horizontal line M, buckling due to entry of the recording material is likely to occur.

From this viewpoint, the gap Xa as the first gap is set to be narrower than the gap Xb as the second gap in a section sandwiched by the horizontal line L and the horizontal line M where buckling of the film F is likely to occur in the embodiment. It is thus possible to reduce bending of the film F on the entry of the recording material P on the upstream side in the conveyance direction of the recording material. On the other hand, an increase in sliding resistance of the film F is curbed as a whole by securing a clearance between the film F and the film guide G on the downstream side.

Here, in regard to the measurement of the gaps Xa and Xb during rotation of the film F, it is possible to perform the measurement by applying laser light of a laser length measurement device to a hole opened at a part of the film F, for example.

Figure 4F:
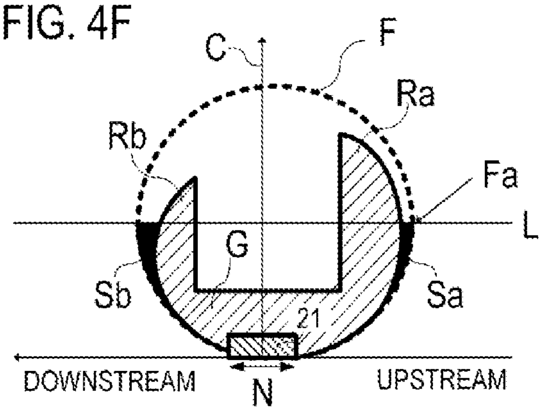

FIG. 4F illustrates areas Sa and Sb of regions surrounded by the boundary from the intersection of the inner surface of the film F with the horizontal line L to the fixing nip portion N, the boundary from the intersections of the guide surfaces of the ribs Ra and Rb with the horizontal line L to the fixing nip portion N, and the horizontal line L when seen in the longitudinal direction of the film. In the embodiment, the area Sa in the region on the upstream side out of the two regions formed in a split manner on the upstream side and the downstream side in the conveyance direction of the recording material by the above boundaries and the horizontal line is narrower than the area Sb in the region on the downstream side. It is thus possible to reduce bending of the film F due to entry of the recording material P on average on the upstream side of the fixing nip portion N in the conveyance direction of the recording material. Also, an increase in a sliding resistance of the film F is curbed as a whole by securing a clearance between the film F and the film guide G on the downstream side.

Note that in regard to the measurement of the areas Sa and Sb during rotation of the film F, it is possible to perform the measurement by applying laser light of a laser length measurement device to a hole opened at a part of the film F, for example. As described above, according to the embodiment, it is possible to prevent buckling of the film caused by entry of the recording material by configuring the ribs on the upstream side in the film guide to further stick out than the ribs on the downstream side.

Note that the configuration of the heater according to the present invention is not limited to the configuration in the above example. For example, it is also possible to suitably apply the present invention to an IH fixing unit that causes a conductive layer of a film to generate heat through electromagnetic induction, a fixing unit in which a halogen heater is disposed at the center of an inner space of a film, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-065674, filed on Apr. 12, 2022, which is hereby incorporated by reference herein in its entirety.

What is claimed is:

1. An image heating device comprising:

a tubular film;

a heater that is disposed in an inner space of the film;

a roller that comes into contact with an outer surface of the film and forms a nip between the roller and the film;

a film guide that guides an inner surface of the film that is driven by and rotates with rotation of the roller, the film guide being disposed in the inner space of the film over an entire region of the inner space of the film with respect to a longitudinal direction of the film; and a flange member that guides a region of end of the inner surface of the film in the longitudinal direction of the film;

wherein the image heating device heats, with heat of the heater, an image formed on a recording material sandwiched and conveyed by the nip during rotation of the roller, and wherein when viewed in the longitudinal direction of the film when the film is rotated, a position on a most upstream side of an outer surface of the flange member in a conveyance direction of the recording material in a region where the inner surface of the film comes into contact is regarded as a first position, when viewed in the longitudinal direction of the film, a position at which a first virtual line that passes through the first position and is parallel with the nip intersects the outer surface of the flange member facing the inner surface of the film on a side downstream than the nip in the conveyance direction is regarded as a second position, when viewed in the longitudinal direction of the film, a position at which the first virtual line intersects an outer surface of the film guide facing the inner surface of the film on a side upstream than the nip in the conveyance direction is regarded as a third position, and when viewed in the longitudinal direction of the film, a position at which the first virtual line intersects the outer surface of the film guide on a side downstream than the nip in the conveyance direction is regarded as a fourth position, a first distance between a second virtual line perpendicular to a center of the nip in the conveyance direction and the first position is longer than a second distance between the second virtual line and the second position, and a third distance between the second virtual line and the third position is longer than a fourth distance between the second virtual line and the fourth position.

2. The image heating device according to claim 1, wherein a first gap between the first position and the third position is narrower than a second gap between the second position and the fourth position.

3. The image heating device according to claim 1, wherein when viewed in the longitudinal direction of the film, an area of a region surrounded by the inner surface of the film from the first position to the nip, the outer surface of the film guide from the third position to the nip, and the first virtual line is narrower than an area of a region surrounded by the inner surface of the film from the second position to the nip, the outer surface of the film guide from the fourth position to nip, and the first virtual line.

4. The image heating device according to claim 3, wherein the film guide includes a guide surface that supports the heater and guides the inner surface of the film on each side in a rotation direction of the film relative to the heater.

5. The image heating device according to claim 4,
wherein the film guide includes
a base portion that includes a recessed portion for accommodating the heater,
a first rib that projects from an upstream side of the base portion in the conveyance direction, and
a second rib that projects from a downstream side of the base portion in the conveyance direction, and
wherein an amount by which the first rib sticks out from the base portion toward the inner surface of the film is greater than that of the second rib in a case of being seen in the longitudinal direction.

6. The image heating device according to claim 5, wherein each of the amount by which the first rib projects from the base portion in the conveyance direction and the amount by which the first rib projects from the base portion in a direction that perpendicularly intersects the conveyance direction is larger than that of the second rib.

7. The image heating device according to claim 6,
wherein a plurality of the first ribs is provided at the base portion to be aligned in the longitudinal direction, and
wherein a plurality of the second ribs is provided at the base portion to be aligned in the longitudinal direction.

8. The image heating device according to claim 1, wherein the outer surface has an end portion on an upstream side and an end portion on a downstream side in the conveyance direction located at positions closer to the nip than the first virtual line in directions that perpendicularly intersect the conveyance direction and the longitudinal direction, respectively.

9. The image heating device according to claim 1,
wherein the heater comes into contact with the inner surface of the film, and
wherein the roller forms the nip along with the heater through the film.

10. An image forming apparatus comprising:
an image forming portion that forms an image on a recording material; and
a fixing portion that fixes the image formed on the recording material to the recording material;
wherein the fixing portion is the image heating device according to claim 1.

11. An image heating device comprising:
a tubular film;
a heater that is disposed in an inner space of the film;
a roller that comes into contact with an outer surface of the film and forms a nip between the roller and the film;
a film guide that guides an inner surface of the film that is driven by and rotates with rotation of the roller, the film guide is disposed in the inner space of the film over an entire region of the inner space of the film with respect to a longitudinal direction of the film; and
a flange member that guides a region of end of the inner surface of the film in the longitudinal direction of the film,
wherein the image heating device heats, with heat of the heater, an image formed on a recording material sandwiched and conveyed by the nip through rotation of the roller,
wherein when viewed in the longitudinal direction of the film when the film is rotated, a position on a most upstream side of an outer surface of the flange member in a conveyance direction of the recording material in a region where the inner surface of the film comes into contact is regarded as a first position,
when viewed in the longitudinal direction of the film, a position at which a first virtual line that passes through the first position and is parallel with the nip intersects the outer surface of the flange member facing the inner surface of the film on a side downstream than the nip in the conveyance direction is regarded as a second position,
when viewed in the longitudinal direction of the film, a position at which the first virtual line intersects an outer surface of the film guide facing the inner surface of the film on a side upstream than the nip in the conveyance direction is regarded as a third position,
when viewed in the longitudinal direction of the film, a position at which the first virtual line intersects the outer surface of the film guide on a side downstream than the nip in the conveyance direction is regarded as a fourth position, and
wherein a first gap between the first position and the third position is narrower than a second gap between the second position and the fourth position.

12. The image heating device according to claim 11, wherein when viewed in the longitudinal direction of the film, an area of a region surrounded by the inner surface of the film from the first position to the nip, the outer surface of the film guide from the third position to the nip, and the first virtual line is narrower than an area of a region surrounded by the inner surface of the film from the second position to the nip, the outer surface of the film guide from the fourth position to nip, and the first virtual line.

13. The image heating device according to claim 11, wherein the outer surface has an end portion on an upstream side and an end portion on a downstream side in the conveyance direction located at positions closer to the nip than the first virtual line in directions that perpendicularly intersect the conveyance direction and the longitudinal direction, respectively.

14. The image heating device according to claim 11, wherein the film guide includes a guide surface that supports the heater and guides the inner surface of the film to each of both sides in a rotation direction of the film relative to the heater.

15. The image heating device according to claim 11,
wherein the film guide includes
a base portion that includes a recessed portion for accommodating the heater,
a first rib that projects from an upstream side of the base portion in the conveyance direction, and
a second rib that projects from a downstream side of the base portion in the conveyance direction, and
wherein an amount by which the first rib sticks out from the base portion toward the inner surface of the film is greater than that of the second rib in a case of being seen in the longitudinal direction.

16. The image heating device according to claim 15, wherein each of the amount by which the first rib projects from the base portion in the conveyance direction and the amount by which the first rib projects from the base portion in a direction that perpendicularly intersects the conveyance direction is larger than that of the second rib.

17. The image heating device according to claim 16, wherein a plurality of the first ribs is provided at the base portion to be aligned in the longitudinal direction, and wherein a plurality of the second ribs is provided at the base portion to be aligned in the longitudinal direction.

18. The image heating device according to claim 11, wherein the heater comes into contact with the inner surface of the film, and wherein the roller forms the nip along with the heater through the film.

19. An image forming apparatus comprising:

an image forming portion that forms an image on a recording material; and a fixing portion that fixes the image formed on the recording material to the recording material;

wherein the fixing portion is the image heating device according to claim 11.

* * * * *